(12) United States Patent
Fukuda et al.

(10) Patent No.: US 10,363,839 B2
(45) Date of Patent: Jul. 30, 2019

(54) SEAT SLIDE ADJUSTER

(71) Applicant: DELTA KOGYO CO., LTD., Aki-gun (JP)

(72) Inventors: Jun Fukuda, Aki-gun (JP); Katsuhiro Inoue, Hiroshima (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 15/767,556

(22) PCT Filed: Oct. 11, 2016

(86) PCT No.: PCT/JP2016/080074
§ 371 (c)(1),
(2) Date: Apr. 11, 2018

(87) PCT Pub. No.: WO2017/065125
PCT Pub. Date: Apr. 20, 2017

(65) Prior Publication Data
US 2018/0297491 A1  Oct. 18, 2018

(30) Foreign Application Priority Data
Oct. 12, 2015  (JP) ................. 2015-201660

(51) Int. Cl.
*B60N 2/08* (2006.01)
*B60N 2/07* (2006.01)

(52) U.S. Cl.
CPC ......... *B60N 2/0818* (2013.01); *B60N 2/0705* (2013.01); *B60N 2/08* (2013.01);
(Continued)

(58) Field of Classification Search
CPC .. B60N 2/0818; B60N 2/0875; B60N 2/0705; B60N 2/0881; B60N 2/0722; B60N 2/07
(Continued)

(56) References Cited

U.S. PATENT DOCUMENTS 5,918,847 A    7/1999  Couasnon
6,113,051 A    9/2000  Moradell et al.
(Continued)

FOREIGN PATENT DOCUMENTS

JP    9-109744 A     4/1997
JP    10-230762 A    9/1998
(Continued)

OTHER PUBLICATIONS

International Search Report dated Dec. 27, 2016, in PCT/JP2016/080074 filed Oct. 11, 2016.

*Primary Examiner* — Muhammad Ijaz
(74) *Attorney, Agent, or Firm* — Oblon, McClelland, Maier & Neustadt, L.L.P.

(57) ABSTRACT

A seat slide adjuster suited to weight-saving has a structure in which two rows of engaged portions are provided at a predetermined interval in a direction orthogonal to a longitudinal direction of a locking plate that constitutes a locking mechanism, and the engaged portions engage with locking tooth parts on both sides of a lower rail during locking. Force that works between the locking plate and the lower rail acts on the locking tooth parts on both sides in a well-balanced manner and is not biased to either side. As a result, the durability of the components thereof can be improved. In addition, because two rows of hole portions in the locking plate engage, rattling of the locking plate is not likely to occur.

9 Claims, 11 Drawing Sheets

(52) U.S. Cl.
CPC .......... *B60N 2/0875* (2013.01); *B60N 2/0881* (2013.01); *B60N 2205/20* (2013.01)

(58) Field of Classification Search
USPC .............. 248/424, 425, 429, 430; 296/65.13, 296/65.14, 65.15; 267/33
See application file for complete search history.

(56) References Cited

U.S. PATENT DOCUMENTS

| | | | |
|---|---|---|---|
| 9,038,981 B2 | 5/2015 | Hoshihara et al. | |
| 9,315,119 B2* | 4/2016 | Yamada ............... | B60N 2/0705 |
| 2002/0179800 A1* | 12/2002 | Flick .................... | B60N 2/0705 |
| | | | 248/429 |
| 2004/0108762 A1* | 6/2004 | Borbe .................. | B60N 2/0705 |
| | | | 297/344.11 |
| 2004/0188586 A1* | 9/2004 | Jaudouin ................ | B60N 2/08 |
| | | | 248/429 |
| 2014/0110553 A1* | 4/2014 | Hoshihara ............... | B60N 2/06 |
| | | | 248/429 |
| 2014/0263920 A1* | 9/2014 | Anticuar .............. | B60N 2/0705 |
| | | | 248/429 |
| 2017/0008425 A1* | 1/2017 | Nagura ................ | B60N 2/0705 |

FOREIGN PATENT DOCUMENTS

| | | |
|---|---|---|
| JP | 2008-120223 A | 5/2008 |
| JP | 2011-79414 A | 4/2011 |
| JP | 2014-83888 A | 5/2014 |

\* cited by examiner

SEAT SLIDE ADJUSTER

TECHNICAL FIELD

The present invention relates to a seat slide adjuster to be used in a seat, more particularly, a vehicle seat for an automobile, an airplane, a train, a ship, a bus, or another type of vehicle.

BACKGROUND ART

A seat slide adjuster includes a lower rail that is mounted to the floor of a vehicle, and an upper rail that is slidably provided to the lower rail and connected to a seat frame (see Patent Literatures 1 and 2). The seat slide adjuster is provided with a locking mechanism, in which a lock is unlocked to slide adjust the relative position of the upper rail with respect to the longitudinal direction of the lower rail to lock and use the upper rail at a desired position.

CITATION LIST

Patent Literature

[Patent Literature 1] JP H9-109744
[Patent Literature 2] JP 2011-79414

SUMMARY OF INVENTION

Technical Problem

On the lower rails in the locking mechanism in Patent Literatures 1 and 2, a locking tooth part that protrudes downward in a comb shape is formed on a lower edge of an inner wall portion bent downward from an upper edge portion, and an engaged portion (configured as a claw that is inserted into a gap between adjacent locking tooth parts in Patent Literature 1, and configured as a hole portion into which the locking tooth part is inserted in Patent Literature 2) provided to a locking plate supported on an upper rail side is engaged with this locking tooth part to put the locking mechanism into a locked state. The engagement between these two components is released by operating the locking plate.

The locking tooth parts on these lower rails are normally provided on both left and right sides of the lower rail in the longitudinal direction. However, as indicated in Patent Literatures 1 and 2, the engaged portion is only formed near one side edge of the locking plate and only engages with one of the left and right locking tooth parts. Therefore, during locking, force that works between the locking plate and the lower rail is biased toward the locking tooth part on the one engaged side, which may affect the durability of the locking tooth part and cause the locking plate to rattle. In addition, in recent years, it has been considered to make the steel material used for the lower rail and the upper rail thinner to achieve a lighter product. However, making the plates thinner causes the lower rail and the upper rail to somewhat more likely warp, thereby making it easier for the locking plate and the locking tooth part to rattle.

The present invention has been made in view of the above circumstances, and has an object to provide a seat slide adjuster that can suppress bias of force that works between a locking plate and a lower rail during locking and contribute to increased durability of the locking plate and lower rail, and that can suppress rattling of the locking plate and provide a high rattling suppression effect even when the lower rail or other components are made of a thinner material than a conventional material, to thereby contribute to producing a thinner product.

Solution to Problem

In order to solve the above-mentioned problem, a seat slide adjuster for adjusting a position of a seat in a front-rear direction according to the present invention includes a lower rail; an upper rail that is slidably provided to the lower rail and connected to a seat frame that comprises a seat; and a locking mechanism that locks the upper rail to the lower rail at an appropriate slide position, in which the lower rail comprises locking tooth parts on both sides in a longitudinal direction that protrude downward in a comb shape, and in which the locking mechanism includes: a locking plate that corresponds to the locking tooth parts located on both sides of the lower rail in the longitudinal direction that includes an engaged portion that engages with the locking tooth parts formed in two rows; and a locking mechanism support member supported on the upper rail side and including elastic support means for elastically supporting the locking plate so as to allow the engaged portion of the locking plate to engage with the locking tooth parts.

The locking mechanism preferably includes a wedge structure including wedge portions that are disposed at a position adjacent to each of the longitudinal edge portions along the longitudinal direction of the upper rail in the locking plate and elastically supported by another elastic support means provided to the locking mechanism support member, and make contact with each of the longitudinal edge portions of the locking plate to press the locking plate inward during locking.

Each of the wedge structures interposed adjacent to each of the longitudinal edge portions of the locking plate preferably includes a plurality of wedge portions at predetermined intervals in a direction orthogonal to the longitudinal direction of the upper rail, and makes contact with a plurality of portions on each of the longitudinal edge portions of the locking plate at predetermined intervals.

The locking mechanism support member preferably includes: a base plate portion fixed to the upper rail side; a locking plate guide shaft that protrudes in a direction of the upper wall of the upper rail from the base plate portion; a pair of wedge guide shafts provided at a predetermined interval to sandwich the locking plate guide shaft that protrude in the direction of the upper wall of the upper rail from the base plate portion; a locking plate spring that is disposed on the locking plate guide shaft and comprises the elastic support means; and a wedge spring that is disposed on the wedge guide shaft and constitutes the another elastic support means.

The locking mechanism preferably further includes an upper bracket disposed on an inner side of the upper rail, in which the base plate portion of the locking mechanism support member is supported by the upper bracket.

It is preferable that the upper bracket is formed into a shape having a substantially U-shaped cross section, an opening side of the upper bracket is disposed so as to face the lower rail side, the base plate portion of the locking mechanism support member is fixed to the opening side, and upper end portions of the locking plate guide shaft and each of the wedge guide shafts are fixed to an upper surface portion of the upper bracket, a substantially box-shaped structure formed of the upper bracket and the base plate portion comprising a strength member.

It is preferable that a highest end position of the wedge spring during extension is preferably set higher than a highest end position of the locking plate spring, and each of the wedge portions of the wedge structure preferably has an inclined surface that protrudes inward along a downward direction, and a lower portion of the incline surface of the wedge portion makes contact with each of the longitudinal edge portions of the locking plate during locking.

A release plate that can be downwardly displaced by operating an unlock operation member is preferably disposed on an upper side of the locking plate and the wedge structure.

The lower rail preferably includes a bottom wall; a pair of opposing first side walls that stand upright from each side of the bottom wall; a pair of top walls that are bent inward toward each other from upper edges of each of the first side walls and have opposing edges separated from each other by a predetermined distance; and inner walls that are bent downward from inner end edges of the upper walls, the locking tooth parts that protrude downward in a comb shape being formed in the inner walls, in which the upper rail includes an upper wall; a pair of opposing second side walls that are bent downward from each side of the upper wall; and folded pieces that are folded outwardly upward from lower end portions of each of the second side walls, the upper rail is disposed such that the folded pieces are positioned between each of the first side walls and the inner walls of the lower rail, each of the folded pieces of the upper rail includes a first inclined piece that extends upward obliquely outward from lower edge portions of the second side walls, and a second inclined piece that extends upward obliquely outward after being bent inward from the first inclined piece, a rolling member is disposed between each of the first inclined piece and the second inclined piece and the lower rail opposed thereto, and the first inclined piece and the second inclined piece are formed at an inclination angle at which respective imaginary extension lines that extend outward of the first inclined piece and the second inclined piece intersect each other.

An intersection angle of the imaginary extension lines is preferably within a range of from 5 to 15°.

Advantageous Effects of Invention

The seat slide adjuster according to the present invention has a structure in which two rows of engaged portions are provided at a predetermined interval in a direction orthogonal to a longitudinal direction of the locking plate that constitutes the locking mechanism, and the engaged portions engage with the locking tooth parts on both sides of the lower rail during locking. Therefore, force that works between the locking plate and the lower rail acts on the locking tooth parts on both sides in a well-balanced manner and is not biased to either side. As a result, the durability of the components thereof can be improved. In addition, because the two rows of engaged portions in the locking plate engage, rattling of the locking plate is not likely to occur.

In addition, by adopting a configuration including the wedge structure that includes the wedge portions that act on each of the longitudinal edge portions along the longitudinal direction of the upper rail in the locking plate, force for pushing the locking plate inward acts during locking, and it is possible to further suppress rattling of the locking plate. Therefore, because the present invention has a configuration in which force acts on the locking tooth parts on both sides of the lower rail in a well-balanced manner so that rattling of the locking plate hardly occurs, the present invention provides a high effect of suppressing rattling and the like and is suited to producing a lighter seat slide adjuster even when a material thinner than a conventional material is used for the lower rail or other components.

Further, the locking mechanism according to the present invention elastically supports the locking plate. More specifically, the locking plate is supported in a so-called half-floating state in which the locking plate can slightly sway in all directions. Therefore, the locking plate is a component that engages with the locking tooth parts on both sides, and quickly engages even if positional displacement occurs between these two components when unlocking. In addition, because the locking plate is elastically supported in this way, force that is applied to the locking plate and the locking tooth part when external force has acted can be absorbed by the elastic support means, and damage to the locking plate and the locking tooth parts can be suppressed. The external force can also be absorbed by the elasticity of elastic support means of the wedge structure while exerting the function of holding the locking plate such that rattling in the locking plate is suppressed. The locking plate is a first locking means that engages with the locking tooth part, and the wedge structure is a component that holds the locking plate and maintains a state of engagement with the locking tooth part and functions as a so-called second locking means. More specifically, due to the elastic support, the locking mechanism according to the present invention allows the second locking means while absorbing impact, a reliable locking function for the locking tooth parts can be provided, and performance with excellent durability and lock action can be achieved.

In addition, as a structure in which the lower rail includes the pair of first side walls, the pair of upper walls bent inward toward each other from the upper edge of the first side walls, and the inner walls bent downward from inner end edges of the upper walls, the upper rail is preferably provided with folding pieces folded outwardly upward from lower edges of the pair of second side walls, and each of the folded pieces is preferably positioned between each of the first side walls and each of the inner walls of the lower rail, two inclined pieces that extend obliquely upward are preferably provided to each of the folded pieces, and rolling members are preferably interposed between wall portions that configure the two inclined pieces and the lower rail. The two inclined pieces are preferably formed at an inclination angle at which respective imaginary extension lines that extend outward of the two inclined pieces intersect each other. With this configuration, even if force acts on any cross-sectional direction of the upper rail, because the rolling members achieve a wedge effect between each of the inclined pieces and the wall portions of the lower rail that oppose the inclined pieces, torsional rigidity of the upper rail can be improved, durability, the effect of suppressing the rattling and the like can be improved, and thinner materials can be used to contribute to further weight reduction.

DESCRIPTION OF EMBODIMENTS

Figure 1:
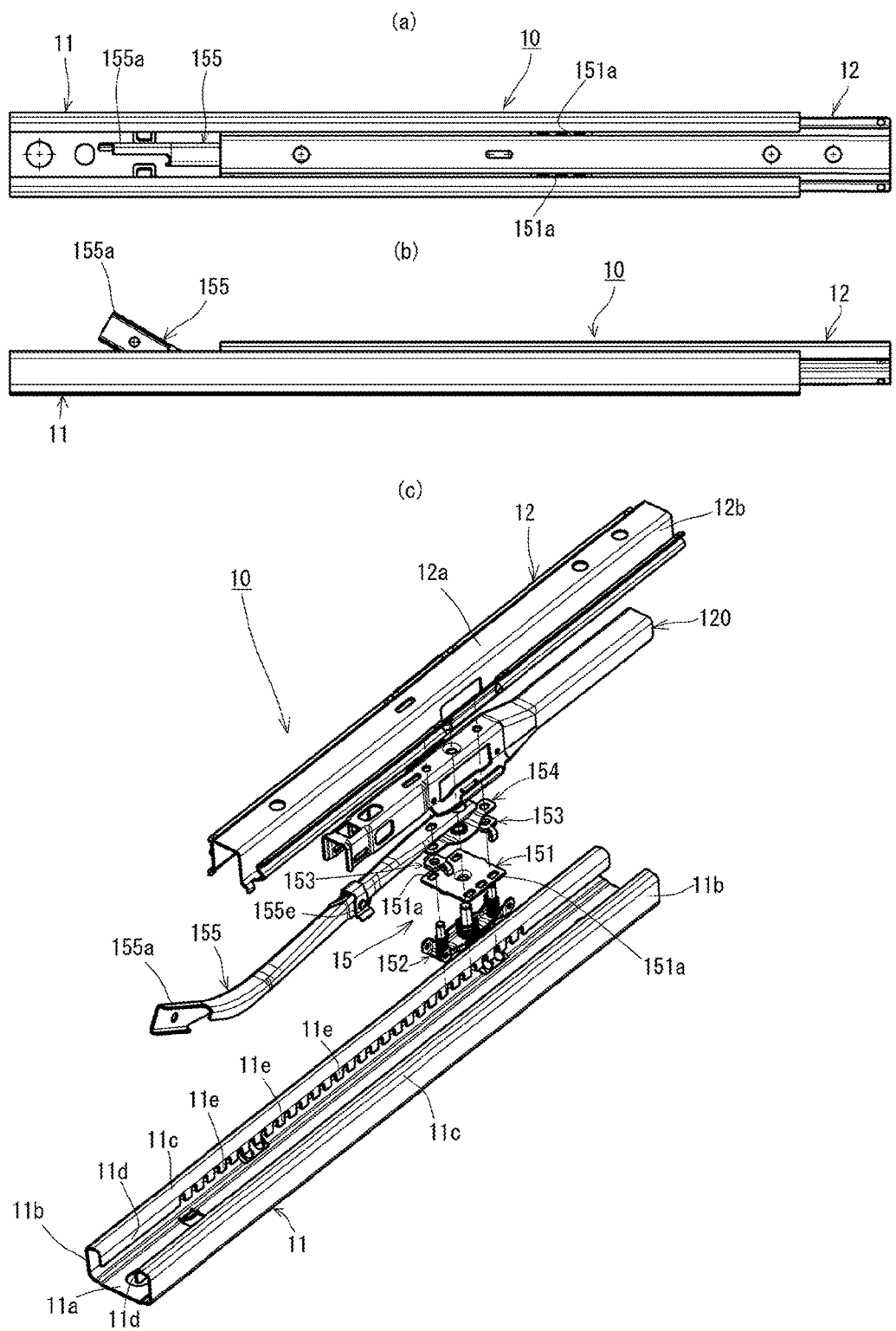
FIG. 1(a) is a plan view.
FIG. 1(b) is a side view.
FIG. 1(c) is an exploded perspective view for illustrating a seat slide adjuster according to one embodiment of the present invention.
Figure 2:
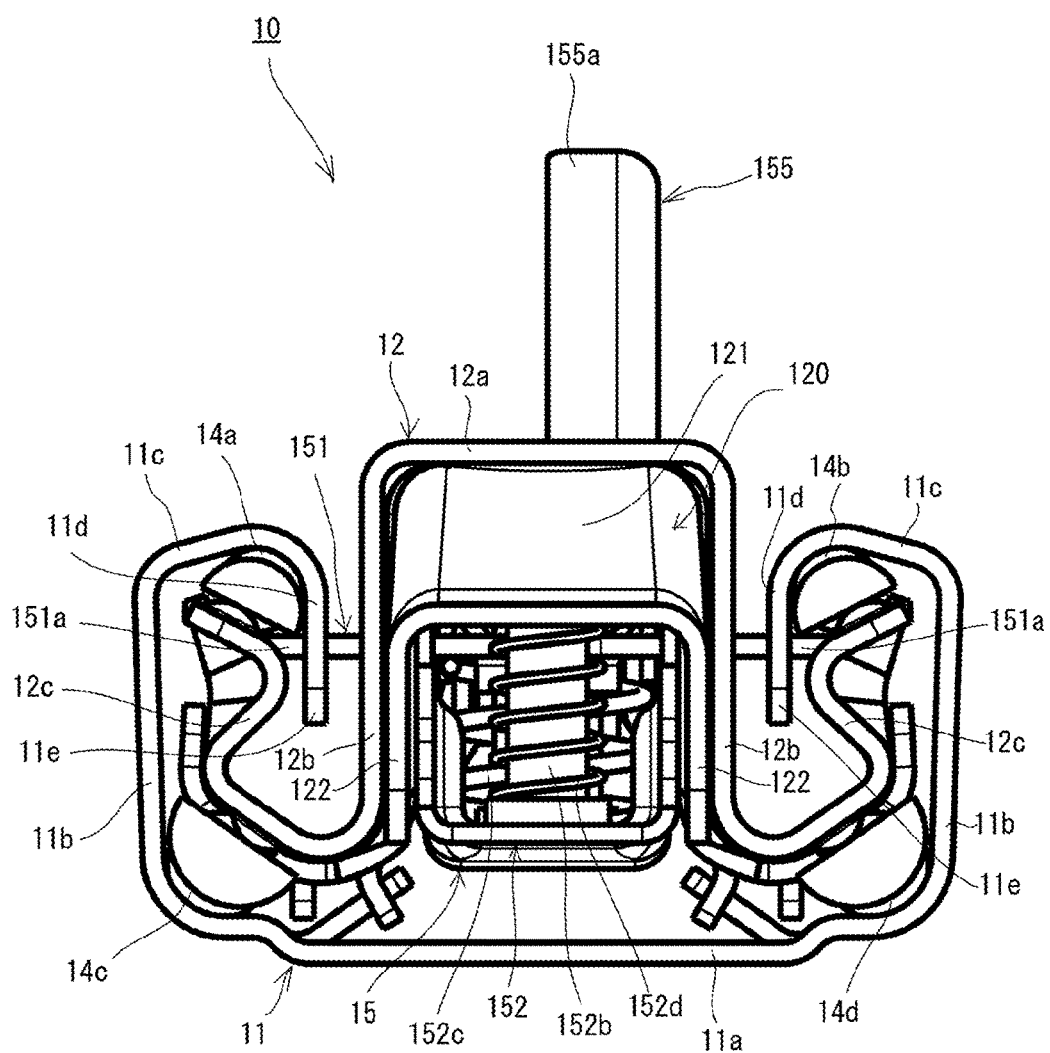
FIG. 2 is a rear view of the seat slide adjuster in FIG. 1 as seen from a rear end side.
Figure 3:
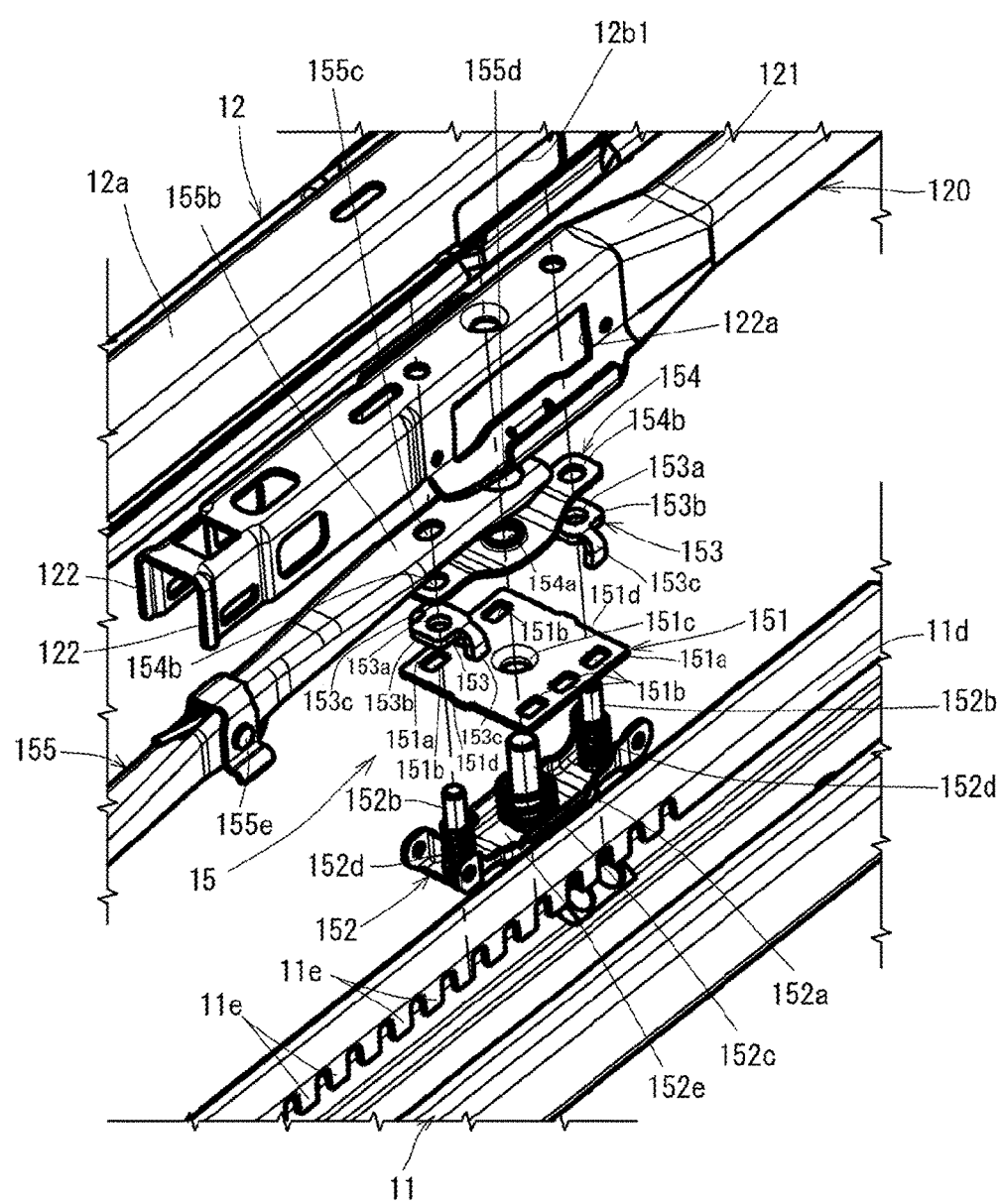
FIG. 3 is an exploded perspective view of main parts.

The present invention is described in further detail with reference to the embodiment illustrated in the drawings. As illustrated in FIGS. 1 to 3, a seat slide adjuster 10 is configured by including a lower rail 11, an upper rail 12, a locking mechanism 15 and the like. A pair of seat slide adjusters 10 is disposed at a predetermined interval in a width direction of a vehicle. Each lower rail 11 is fixed to the vehicle floor and each side frame of the seat is connected to each upper rail 12.

The lower rail 11 includes a bottom wall 11a, a pair of opposing side walls (first side wall) 11b, 11b that stand upright from each side of the bottom wall 11a, a pair of top walls 11c, 11c that are bent inward toward each other from upper edges of each first side walls 11b, 11b and have opposing edges separated from each other by a predetermined distance, and inner walls 11d, 11d that are bent downward from an inner end edge of the upper walls 11c, 11c, and has a widthwise cross section orthogonal to the longitudinal direction formed into an approximate U-shape upper surface opening. Locking tooth parts 11e, 11e that protrude downward in a comb shape are formed on each lower edge of the two inner walls 11d, 11d.

The upper rail 12 includes an upper wall 12a, and a pair of opposing side walls (second side walls) 12b, 12b that are bent downward from each side of the upper wall 12a and has a widthwise cross section formed into an approximate U-shape lower surface opening. In addition, the upper rail 12 also includes folding pieces 12c, 12c folded outwardly upward from lower edges of each second side wall 12b, 12b. So that the folded pieces 12c, 12c face each of the side walls 11b, 11b of the lower rail 11, the upper rail 12 is positioned and disposed between the side walls 11b, 11b and the inner walls 11d, 11d (see FIG. 2).

Figure 8:
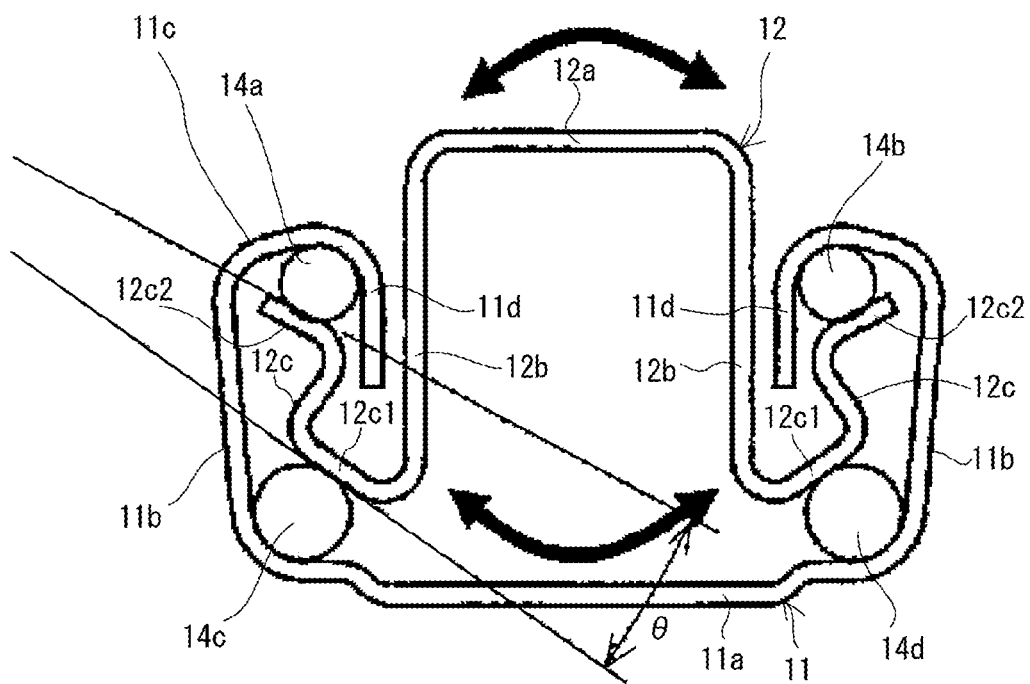
FIG. 8 is a diagram for describing action of a first inclined side piece and a second inclined side piece provided on a folded piece of the upper rail.
Figure 9:
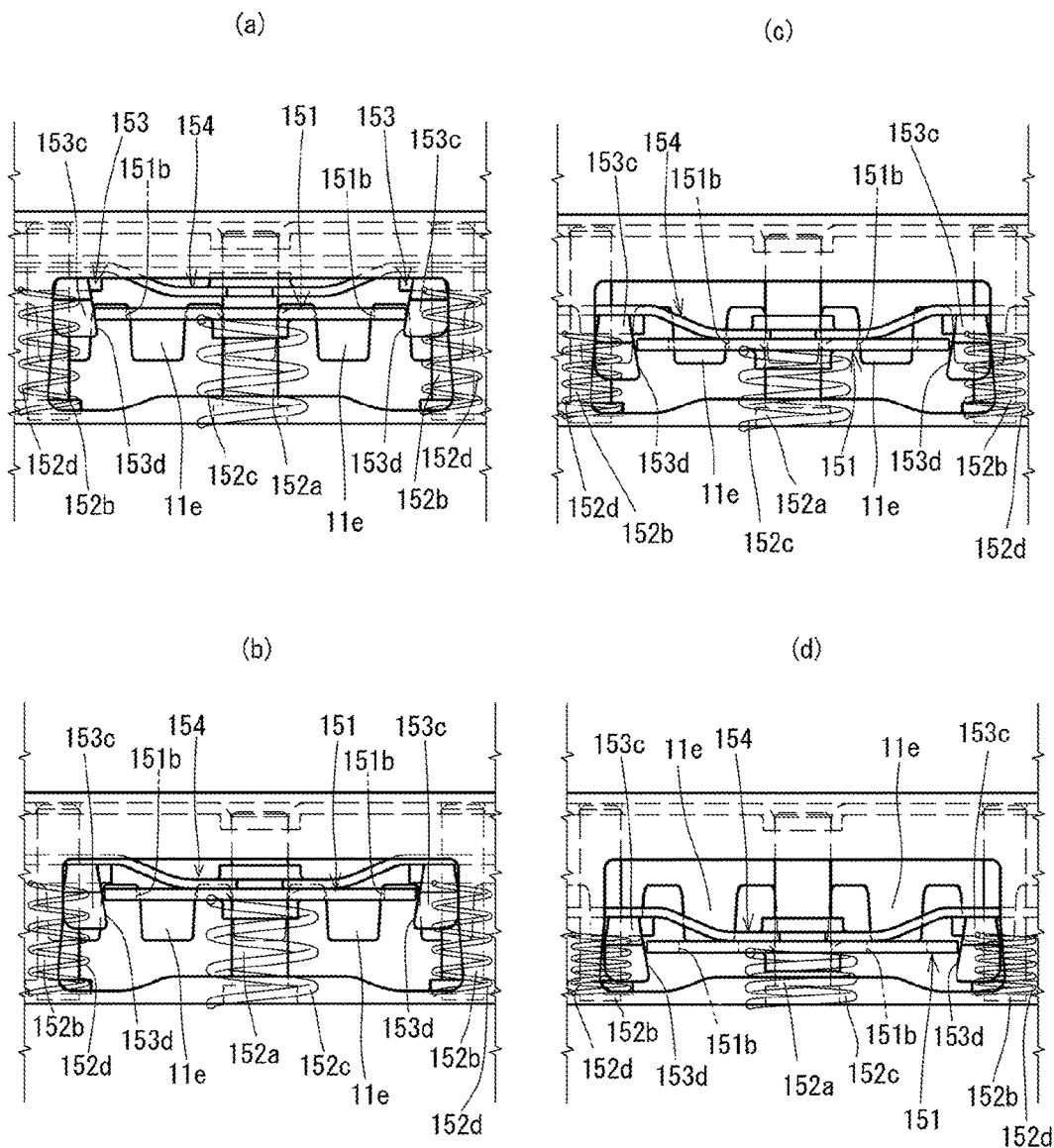
FIGS. 9(a) to 9(d) are diagrams for explaining effect from a locked state until unlocking.
Figure 10:
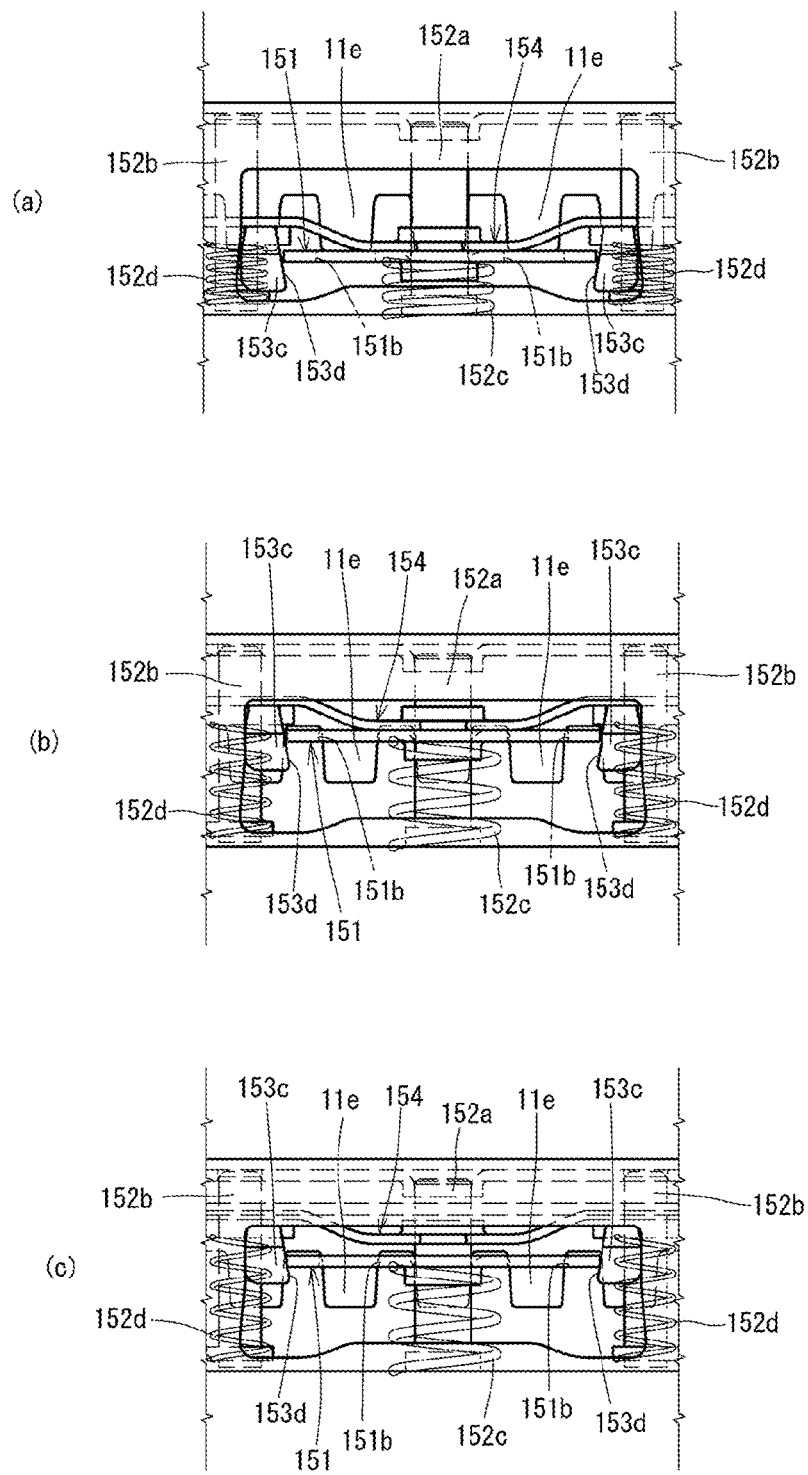
FIGS. 10(a) to 10(c) are diagrams for explaining effect from an unlocked state until locking.
Figure 11:
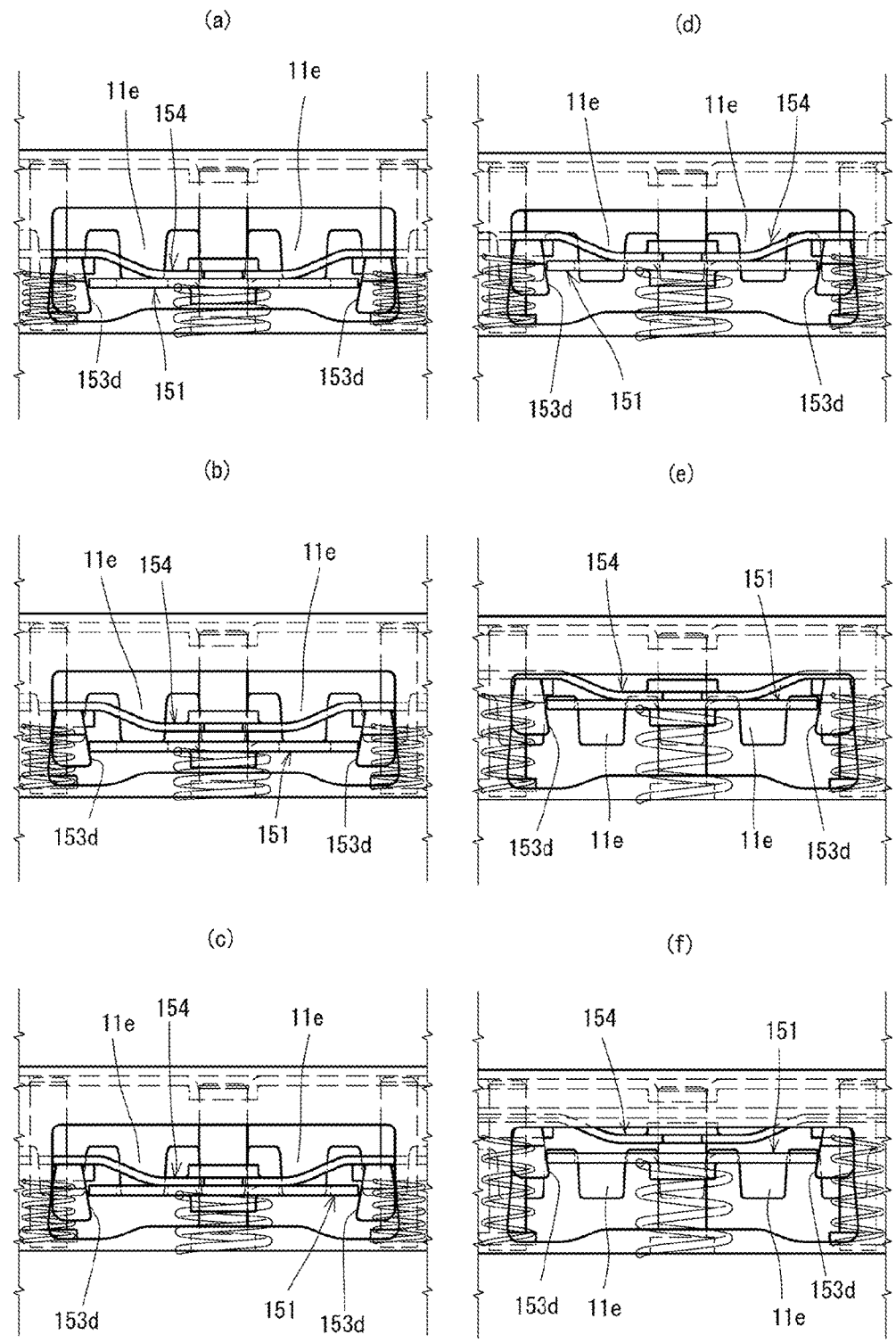
FIGS. 11(a) to 11(f) are diagrams for explaining effect from an unlocked state until locking when a hole portion of the locking plate is engaged with the locking tooth part while sliding.

As illustrated in FIGS. 2 and 8, balls 14a to 14d acting as rolling members are interposed between the lower rail 11 and the upper rail 12 such that the upper rail 12 is slidably provided in the longitudinal direction with respect to the lower rail 11 fixed to the vehicle floor.

More specifically, as illustrated in FIG. 8, each of the folded pieces 12c, 12c of the upper rail 12 has a first inclined piece 12c1 that extends upward obliquely outward from lower edge portions of the second side walls 12b, 12b, and a second inclined piece 12c2 that extends upward obliquely outward after being bent inward from the first inclined piece 12c. The rolling members are preferably disposed between the first inclined piece 12c1 and the second inclined piece 12c2 and the lower rail opposed to the first inclined piece 12c1 and the second inclined piece 12c2, and the first inclined piece 12c1 and the second inclined piece 12c2 are preferably formed at an inclined angle at which imaginary extension lines intersect, the imaginary extension lines extending from the outside of each of the first inclined piece 12c1 and the second inclined piece 12c2. An angle θ at which the first inclined piece 12c1 and the second inclined piece 12c2 intersect is preferably within a range of from 5 to 15°.

Each of the first inclined portions 12c1, 12c1 is disposed so as to oppose a curved portion located at a boundary between the lower wall 11a and the first side walls 11b, 11b in the lower rail 11, and two balls 14c, 14d are interposed therebetween. Each of the second inclined pieces 12c2, 12c2 is disposed so as to oppose a curved portion located at a boundary between the upper walls 11c, 11c and the inner walls 11c, 11c in the lower rail 11, and two balls 14a, 14b are interposed therebetween. Therefore, when the upper rail 12 is twisted in the cross-sectional direction indicated by the arrow in FIG. 8, the first inclined piece 12c1 on one side outwardly displaces when the upper rail 12 is twisted in one direction. Therefore, the ball 14c on one side located low on that side tries to relatively displace in a direction in which a gap becomes smaller between the first inclined piece 12c1 on one side and a boundary between the bottom wall 11a and the first wall 11b on one side opposed to the first inclined piece 12c1, which causes a wedge action. At this time, the other ball 14a located on an upper side between the second inclined piece 12c2 on one side and the upper wall 11c and the inner wall 11d on one side that opposes the second inclined piece 12c2 also tries to relatively displace in the direction in which a gap between those two components becomes smaller to cause the wedge effect. When the upper rail 12 is twisted in the opposite direction, contrary to the above, the ball 14d on the other side located low on that side tries to relatively displace in a direction in which a gap becomes smaller between the first inclined piece 12c1 on the other side and a boundary portion between the bottom wall 11a and the first wall 11b on the other side that oppose the first inclined piece 12c1. Similarly, the ball 14b on the other side located high on that side tries to displace in a direction in which a gap becomes smaller between the second inclined piece 12c2 on the other side and the upper wall 11c and the inner wall 11d on the other side that oppose the second inclined piece 12c2. Both cause the wedge action.

With this configuration, torsional rigidity of the upper rail 12 is improved, and a thinner material can be selected for the upper rail 12, which can contribute to a lighter product.

Next, a locking mechanism 15 used in the seat slide adjuster 10 according to this embodiment is described. As illustrated in FIGS. 1(c) and 3, this locking mechanism 15 includes, for example, a locking plate 151, a locking mechanism support member 152, wedge structures 153, 153, a release plate 154, an unlock operation member 155, and is supported by an upper bracket 120.

The upper bracket 120 is formed into a shape that has an approximate U-shaped widthwise cross section having an upper surface portion 121 and a pair of side surface portions 122, 122 bent downward from side edges of the upper surface portion 121 in the width direction and, with an opening side facing the lower rail 11, an appropriate site is fixed by being welded or the like, preferably laser welded, to the upper wall 12a and the side walls 12b, 12b on the inner side of the upper rail 12.

At an appropriate position of the side surface portions 122, 122 of the upper bracket 120, windows 122a, 122a are formed so as to penetrate those portions, and windows 12b1, 12b1 at corresponding positions are also formed so as to penetrate in the side surface portions 12b, 12b of the upper rail 12. The locking plate 151 is formed into a substantially rectangular shape in plan view, and a pair of opposing side edge portions 151a, 15a are both disposed so as to protrude out from the windows 122a, 12b1 that correspond to the side edge portions 151a, 151a (see FIGS. 2 and 3). A plurality of hole portions 151b, 151b are formed in the side edge portions 151a, 151a along the longitudinal direction of the lower rail 11 and the upper rail 12. A gap between adjacent hole portions 151b, 151b in this longitudinal direction is formed so as to be equal to a gap between adjacent locking tooth parts 11e, 11e in the longitudinal direction of the lower rail 11, and the hole portions 151b, 151b are formed at a size at which the locking tooth parts 11e, 11e can be inserted (see FIGS. 4 to 7). These hole portions 151b, 151b are engaged portions that engage with the locking tooth parts 11e, 11e.

Figure 4:
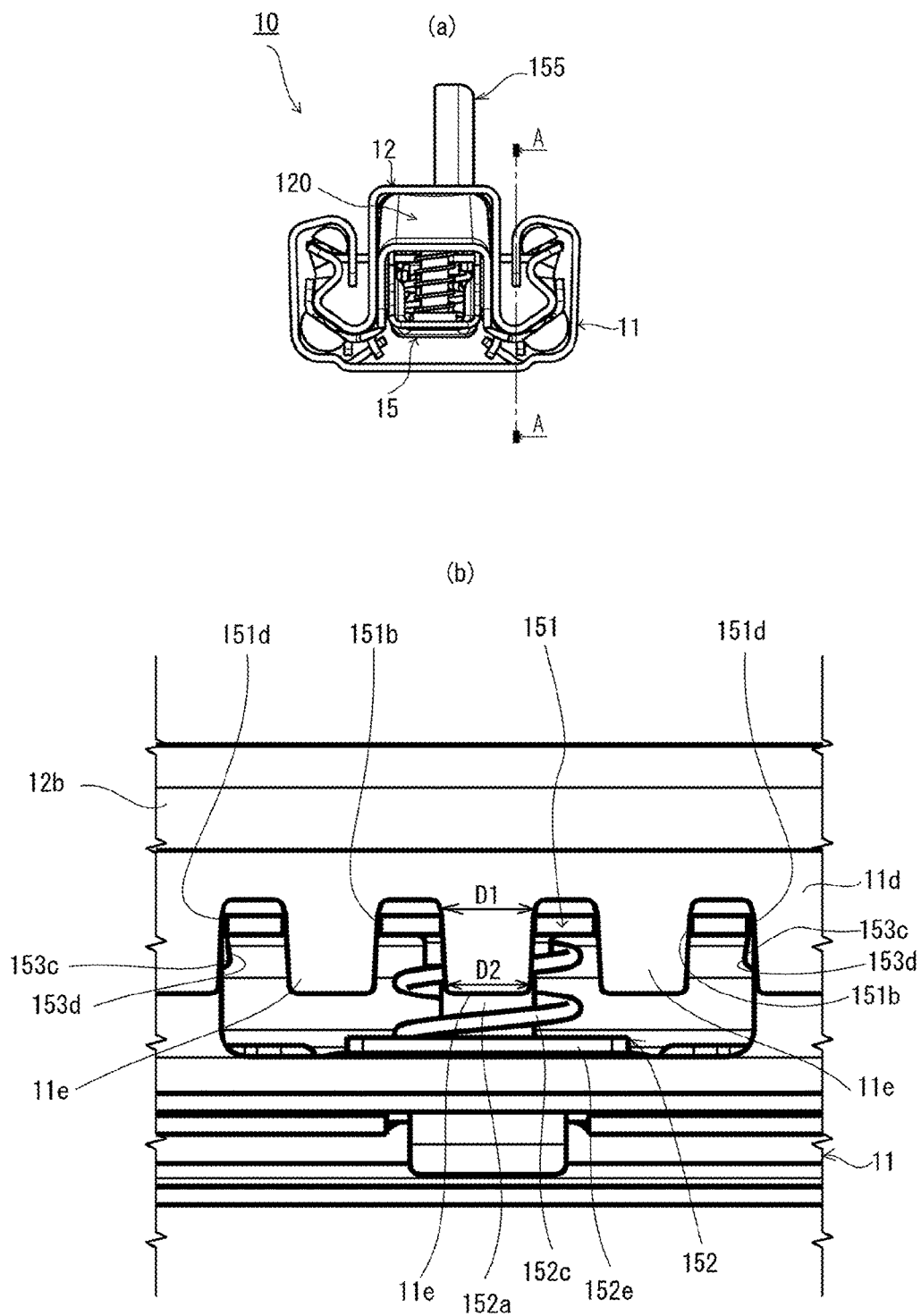
FIG. 4(a) is a rear view for illustrating a cross-sectional position of a cross sectional view.
FIG. 4(b) is a cross-sectional view along the line A-A in FIG. 4(a).
Figure 5:
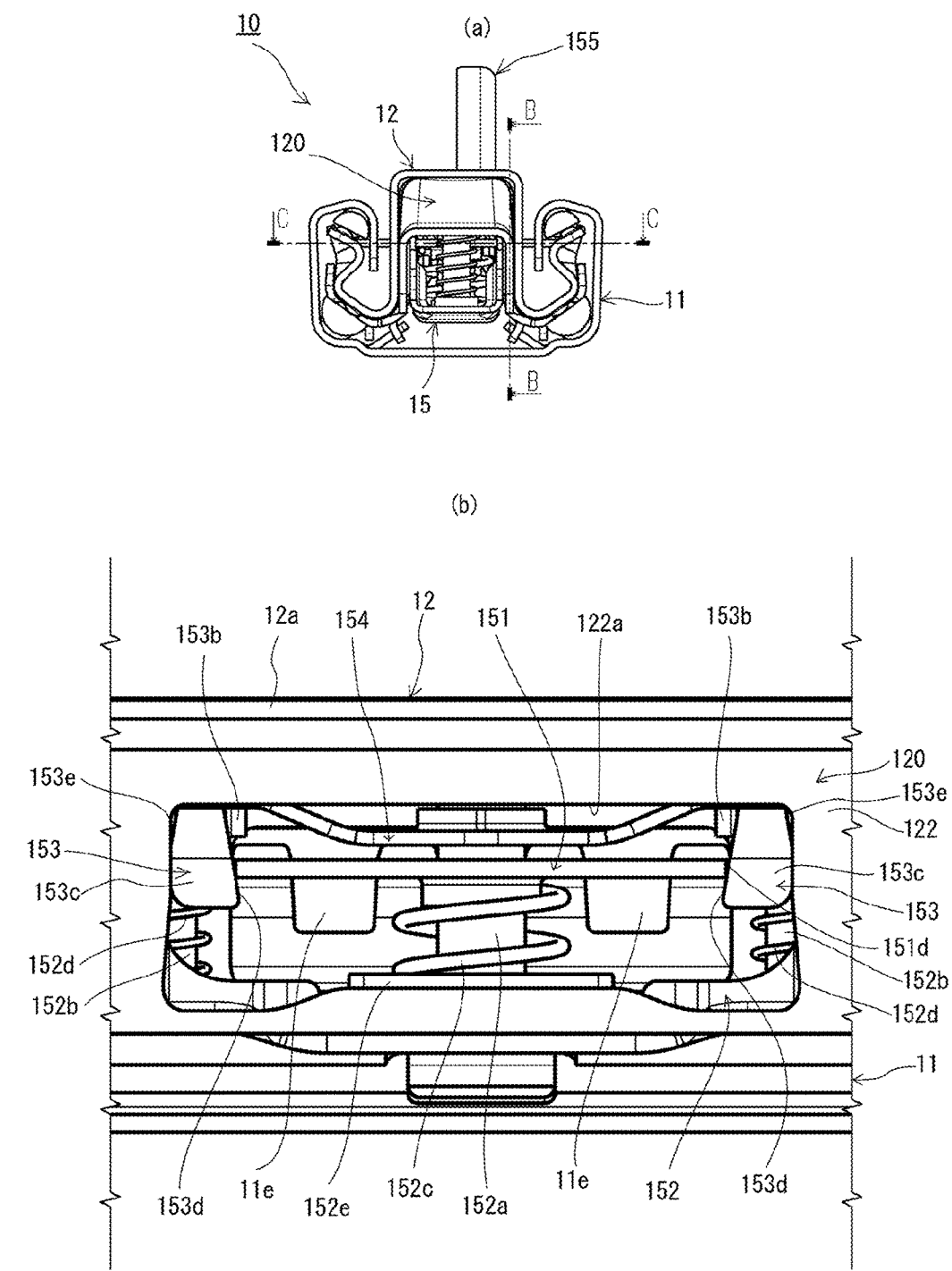
FIG. 5(a) is a rear view for illustrating a cross-sectional position of a cross sectional view.
FIG. 5(b) is a cross-sectional view along the line B-B in FIG. 5(a).

As illustrated in FIGS. 4(b), 5(b), 6 and 7(b), the locking tooth parts 11e, 11e formed in the lower rail 11 are preferably formed into a tapered shape with a width that decreases along a downward direction (the width D2 of the tooth tip is narrower than the width D1 of the tooth tip illustrated in FIG. 4(b)). With this configuration, the locking tooth part 11e, 11e can be inserted more easily into the hole portion 151b, 151b of the locking plate 151 during locking. In addition, the tooth tip of the locking tooth part 11e, 11e preferably has a smaller width than the hole portion 151b, 151b as this makes the locking tooth part 11e, 11e easier to insert, but the vicinity of the dedendum is preferably wider than the width of the hole portion 151b, 151b. During locking as illustrated in FIGS. 4 and 5, the gap between the locking tooth parts 11e, 11e and the hole portions 151b, 151b becomes smaller, and rattling can be suppressed.

The locking mechanism support member 152 includes a base plate portion 152e, a locking plate guide shaft 152a that protrudes in the direction of the upper surface portion 121 of the upper bracket 120 from the base plate portion 152e (direction of the upper wall 12a of the upper rail 12), and a pair of wedge guide shafts 152b, 152b that sandwich the locking plate guide shaft 152a at predetermined intervals along the longitudinal direction of the upper rail 12, and protrude in the same direction as the locking plate guide shaft 152a (the direction of the upper wall 12a of the upper rail 12).

The locking plate 151, a wedge structure 153, a release plate 154 and an unlock operation member 155 are positioned between the upper surface portion 121 of the upper bracket 120 and the locking mechanism support member 152, and the base plate portion 152e is fixed by welding or the like, preferably by laser welding, near a lower portion of the side surface portions 122, 122 of the upper bracket 120. By adopting such a configuration, more specifically, by providing the base plate portion 152e, supporting the locking plate guide shaft 152a and wedge guide shafts 152b, 152b with the base plate portion 152e and fixing the base plate portion 152e to the upper bracket 120, compared to a case in which each of guide shafts 152a, 152b is directly supported by the upper rail 12, there is no need to form a processed hole or the like for supporting these components, and the upper rail 12 does not lose strength. In addition, the upper bracket 120 with the approximately U-shaped cross section and the base plate portion 152e are integrated so that their cross-sections have an approximate box shape and function as a strength member that acts against external force. Further, upper edges of the locking plate guide shaft 152a and the wedge guide shafts 152b, 152b that protrude to the base plate portion 152e are welded or the like, preferably laser welded, to the upper surface portion 121 of the upper bracket 120, to thereby integrate these components and become a support pillar as a portion that exerts high strength. Movable portions in the locking mechanism 15 such as the locking plate 151, the wedge structure 153, a release plate 154, and an unlock operation member 155 are housed in this structure with an approximately box-shaped cross section, and hence have a high function of prevention against damage caused by external forces or other factors.

The locking plate 151 is disposed such that the locking plate guide shaft 152a is inserted into a guide hole 151c formed so as to penetrate the center of the locking plate 151. In addition, a locking plate spring 152c is disposed on the locking plate guide shaft 152a. The locking plate spring 152c corresponds to elastic support means that elastically supports the locking plate 151 so as to bias the locking plate 151 in the direction of the upper surface portion 121 of the upper bracket 120, that is, upward. However, the length of the upper rail 12 of the locking plate 151 along the longitudinal direction is not long enough to make contact with a pair of wedge guide shafts 152b, 152b (see FIGS. 3 and 6). In addition, wedge springs 152d, 152d are disposed on the wedge guide shafts 152b, 152b. The wedge spring 152d acts as another elastic support means that elastically supports the wedge structures 153, 153 to be described later so as to similarly bias the wedge structures 153, 153 upward.

Figure 6:
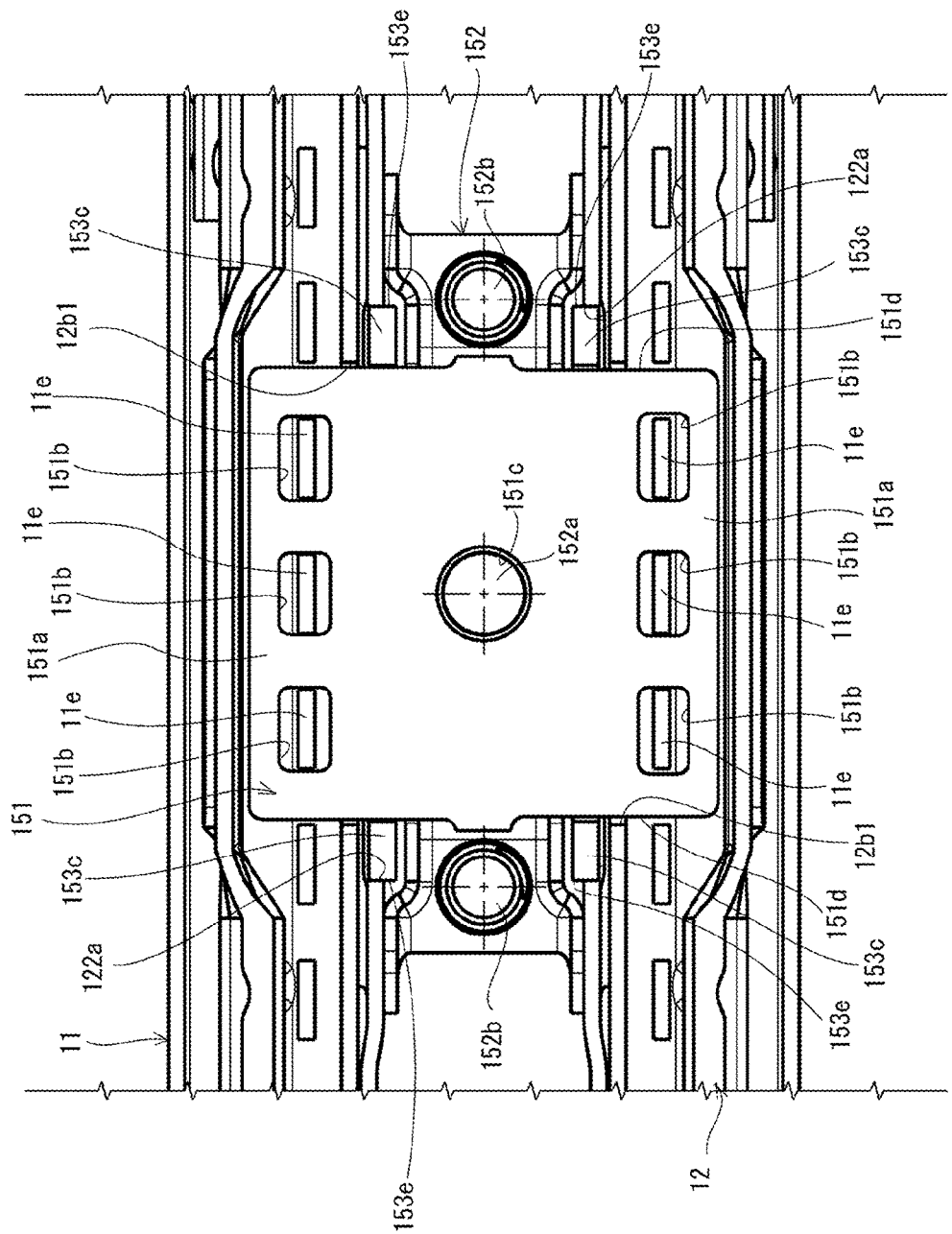
FIG. 6 is a cross-sectional view along the line C-C in FIG. 5(a).
Figure 7:
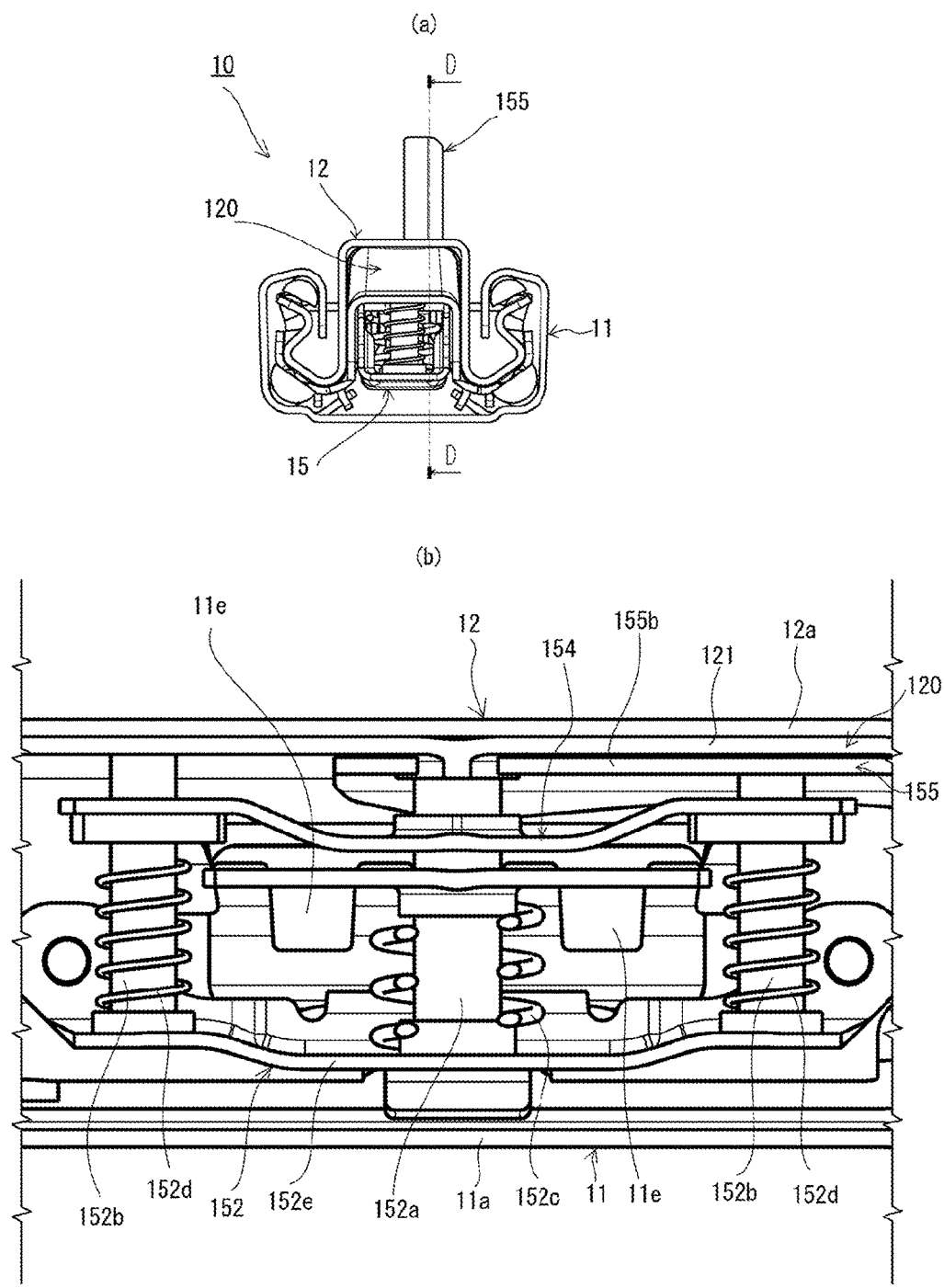
FIG. 7(a) is a rear view for illustrating a cross-sectional position of a cross sectional view.
FIG. 7(b) is a cross-sectional view along the line D-D in FIG. 7(a).

The wedge structures 153, 153 include support plate portions 153b, 153b that include insertion holes 153a, 153a through which the wedge guide shafts 152b, 152b are inserted, and wedge portions 153c, 153c that extend downward and protrude slightly toward the direction of each of the side surface portions 122, 122 of the upper bracket 120 to sandwich the support plate portions 153b, 153b. In side view, the wedge portions 153c, 153c include inclined surfaces 153d, 153d that protrude downwardly inward (in the direction approaching the locking plate 151). More specifically, among the distance between the inclined surfaces 153d, 153d, a distance between portions closer to lower portions of the surfaces is formed shorter than the length between end edge portions (hereinafter, longitudinal edge portions) 151d, 151d along the longitudinal direction of the upper rail 12 in the locking plate 151 (see FIGS. 4(b), 5(b) and 7(b)). Therefore, when positions of contact of the inclined surfaces 153d, 153d of the wedge portions 153c, 153c relative to the longitudinal edge portions 151d, 151d of the locking plate 151 become relatively lower, a wedge effect is exerted of pushing the longitudinal edge portions 151d, 151d of the locking plate 151 inward from both sides in side view. As illustrated in FIGS. 5(b) and 6, outer edge surfaces 153e, 153e along the longitudinal direction of the upper frame 12 in the wedge portions 153c, 153c abut against a window frame portion of the window 122a of the upper bracket 120 to restrict movement in a direction of expansion.

In the wedge structure 153, the wedge guide shafts 152b, 152b are inserted into the through holes 153a, 153a, and the wedge structure 153 is biased upward by the wedge springs 152d, 152d. In order to cause the wedge structures 153, 153 to perform the above-described wedge action, the wedge springs 152d, 152d are provided such that a highest edge position thereof during extension is higher than that of the locking plate spring 152c (see FIG. 7(b) and FIGS. 9 to 11).

With this configuration, the wedge structures 153, 153 have a larger displacement amount from the lowest edge position to the highest edge position than the locking plate 151.

The release plate 154 includes a central insertion hole 154a, and edge portion insertion holes 154b, 154b provided at positions separated from the central insertion hole 154a along the longitudinal direction of the upper rail 12 by a predetermined distance. The release plate 154 is disposed on the side of the upper surface portion 121 of the upper bracket 120, which is an upper side of the locking plate 151 and the wedge structures 153, 153. A locking plate guide shaft 152a that is inserted into a guide hole 151c of the locking plate 151 is inserted into the central insertion hole 154a, and wedge guide shafts 152b, 152b that penetrate the through holes 153a, 153a of the wedge structures 153, 153 are inserted through the edge portion insertion holes 154b, 154b.

In addition, in order to make the highest edge position of the wedge springs 152d, 152d during extension higher than the highest edge position of the locking plate spring 152c during extension, the size of a gap between the release plate 154 and an unlock operation member 155 to be described later and the upper surface portion 121 of the upper bracket 120 is set such that the release plate 154 further separates from the locking plate 151 and displaces upward clue to the wedge springs 152d, 152d (see the states in FIGS. 9(a) and 10(c)) after the locking plate spring 152c is fully extended.

The unlock operation member 155 has a predetermined length and is disposed on an inner side of the upper rail 12 (see FIGS. 1 to 3). A front end portion 155a of the unlock operation member 155 protrudes from a front end of the upper rail 12, and a grip portion (not shown) is connected to this front end portion 155a to allow an operator to vertically operate the unlock operation member 155. When the front end portion 155a vertically displaces about a midway part of the unlock operation member 155 in the longitudinal direction, a rear end part 155b displaces in the opposite direction. Therefore, the release plate 154 is provided so as to be pressed downward by the rear end portion 155b. In this embodiment, as illustrated in FIGS. 3 and 7(b), the rear end portion 155b is disposed between the release plate 154 and the upper surface portion 121 of the upper bracket 120, and is configured to be able to push the release plate 154 downward. More specifically, through holes 155c, 155d that correspond to an end portion insertion hole 154b and a center insertion hole 154a on the front edge of the release plate 154 are formed in the rear end portion 155b. One wedge guide shaft 152b and the locking plate guide shaft 152a are inserted into these through holes 155c, 155d. Therefore, when the rear end portion 155b displaces downward along these guide shafts 152a, 152b, the release plate 154 can be pushed downward. Note that how these components communicate with each other is not limited as long as the release plate 154 can be biased downward.

In order to operate as described above, the unlock operation member 155 is provided such that a convex portion 155e provided at the midway portion in the longitudinal direction is axially supported between the side surface portions 122, 122 of the front end portions of the upper bracket 120. After each of these components has been disposed as described above, respective upper end surfaces of the locking plate guide shaft 152a and the wedge guide shafts 152b, 152b are fixed to the upper surface portion 121 of the upper bracket 120 by welding or the like, as described above.

Next, action of the seat slide adjuster 10 according to this embodiment is described. First, in a locked state, as illustrated in FIGS. 4(b), 5(b), 7(b) and 9(a), the hole portions 151b, 151b formed in respective side edge portions 151a, 151a of the locking plate 151 are engaged with the locking tooth parts 11e, 11e formed on both sides of the lower rail 11 in the longitudinal direction. More specifically, it is not the case that only the hole portion 151b of one side edge portion 151a of the locking plate 151 engages with one row of locking tooth parts 11e in the lower rail 11, and the hole portions 151b, 151b formed in both the side edge portions 151a, 151a engage with the row of locking tooth parts 11e, 11e on both left and right sides of the lower rail. Therefore, during locking, when force is applied via the upper rail 12 or the lower rail 11, the locking plate 151 is not supported by being biased to any one rail, and is supported through engagement between the rows of locking tooth parts 11e, 11e on both sides and the hole portions 151b, 151b of the side edge portions 151a, 151a on both sides of the locking plate 151. Therefore, well-balanced support and excellent dispersibility of the load that is repeatedly input to the upper rail 12 and the lower rail 11 can be achieved, and the durability of the locking tooth parts 11e, 11e, the locking plate 151, and other components can be improved compared to a conventional configuration. In addition, rattling of the locking plate 151 can be suppressed compared to a conventional structure in which only one side is engaged.

Further, during locking, because the position of the wedge structures 153, 153 rises such that the release plate 154 separates by a predetermined distance from the locking plate 151 due to the wedge springs 152d, 152d, the position of contact between the inclined surface 153d, 153d of the wedge portion 153c, 153c of the wedge structures 153, 153 and the longitudinal edge portion 151d, 151d of the locking plate 151 becomes relatively lower. As a result, the wedge effect of pushing the longitudinal edge portions 151d, 151d of the locking plate 151 inward in side view is exerted, and rattling of the locking plate 151 is further suppressed. In addition, the wedge structures 153, 153 each include a plurality of wedge portions 153c, 153c, in this embodiment two each, and a total of four wedge portions 153c, 153c act at predetermined intervals in the longitudinal direction and the width direction. Therefore, movement of the locking plate 151 in a rotation direction can also be suppressed, and the effect of suppressing the rattling is extremely high.

In addition, the locking plate 151 is elastically supported by the locking plate spring 152c, and the wedge structures 153, 153 are elastically supported by the wedge springs 152d, 152d. Therefore, the force that acts on the hole portions 151b, 151b of the locking plate 151 and the locking tooth parts 11e, 11e when external force is applied can be absorbed by the locking plate spring 152c and the wedge springs 152d, 152d. More specifically, through the locking plate 151 only moving slightly as if to shake even if external force is applied, damage that occurs between engaged members, more specifically, between the hole portions 151b, 151b of the locking plate 151 and the locking tooth parts 11e, 11e can be suppressed. In addition, during locking, as described above, because the locking functions in two steps of locking between the hole portions 151b, 151b of the locking plate 151 and the locking tooth parts 11e, 11e, and further locking between the locking plate 151 and the wedge structure 153, a high locking function can be achieved.

When unlocking from a locked state, first, the front edge portion 155a of the unlock operation member 155 operates upward. With this configuration, the rear end portion 155b relatively moves downward. When the rear end portion 155b displaces downward, the release plate 154 is pushed downward. During locking, the release plate 154 is separated from the locking plate 151 due to the wedge springs 152d, 152d (see FIG. 9(a)), and when the release plate 154 is pushed downward, first, the wedge structures 153, 153 are pushed downward against the elastic force of the wedge springs 152d, 152d. As a result, as illustrated in FIG. 9(b), the position of contact of the inclined surfaces 153d, 153d of the wedge portions 153c, 153c moves upward relative to the longitudinal edge portions 151d, 151d of the locking plate 151, and the wedge effect weakens. When the release plate 154 moves further downward and abuts against the locking plate 151, as illustrated in FIG. 9(c), the release plate 154 displaces downward together with the wedge structures 153, 153 and the locking plate 151 against the elastic force of the locking plate spring 152c. When the hole portions 151b, 151b of the locking plate 151 displace downward by a predetermined amount and separate from the locking tooth parts 11e, 11e of the lower rail 11, the state changes to the unlocked state illustrated in FIG. 9(d). With this configuration, the upper rail 12 moves back and forward relative to the lower rail 11 to adjust the position.

If the predetermined position adjustment is performed, the force that operated the front end portion 155a of the unlock operation member 155 upward is released. Because the force that relatively lowered the rear end portion 155b of the unlock operation member 155 no longer exists, the elastic force of the locking plate spring 152c and the wedge springs 152d, 152d causes the locking plate 151 and the wedge structures 153, 153 to rise along the locking plate guide shaft 152a and the wedge guide shafts 152b, 152b. With this configuration, as illustrated in FIG. 10(b), from the unlocked state in FIG. 10(a), the locking tooth parts 11e, 11e of the lower rail 11 is inserted from the tooth tips into the hole portions 151b, 151b of the locking plate 151 to lock the locking plate 151. Because the wedge springs 152d, 152d extend further higher than the locking plate spring 152c, even after the locking plate spring 152c fully extends, the wedge structures 153, 153 displace upward together with the release plate 154. As a result, as illustrated in FIG. 10(c), the longitudinal edge portions 151d, 151d of the locking plate 151 come into contact at the lower portions of the inclined surfaces 153d, 153d of the wedge portions 153c, 153c to exert the wedge effect, and rattling of the locking plate 151 can be suppressed as described above.

Next, an effect when positional deviation occurs between the hole portions 151b, 151b of the locking plate 151 and the locking tooth parts 11e, 11e of the lower rail 11 when locking from the unlocked state is described. As described above, the locking plate 151 is elastically supported by the locking plate spring 152c, and the locking tooth parts 11e, 11e are formed such that a width (D2) of the tooth tip narrows and slightly narrower than the hole portions 151b, 151b. In addition, the locking plate 151 has one guide hole 151c through which a locking plate guide shaft 152a is merely inserted. Therefore, the locking plate 151 can sway slightly in either direction. As a result, when positional deviation occurs between the hole portions 151b, 151b of the locking plate 151 and the locking tooth parts 11e, 11e of the lower rail 11 the locking plate 151 slightly displaces in the lateral direction, and the locking tooth parts 11e, 11e are inserted into the hole portions 151b, 151b. Therefore, in this case, as illustrated in FIG. 11(b), while the locking plate 151 displaces in the lateral direction or the like, the wedge structures 153, 153 first rise from the unlocked state illustrated in FIG. 11(a) with the release plate 154 because of the wedge springs 152d, 152d. At this time, because lower portions of the inclined surfaces 153d, 153d of the wedge portions 153c, 153c expand inward, the wedge structures 153, 153 rise until those portions make contact with the longitudinal edge portions 151d, 151d of the locking plate 151. Thereafter, when the hole portions 151b, 151b of the locking plate 151 match the locking tooth parts 11e, 11e, as illustrated in FIG. 11(c), the locking plate 151 rises until the locking plate 151 abuts against the release plate 154 due to the elastic force of the locking plate spring 152c. In this way, even when there is a delay in the rising operation of the locking plate 151, the locking plate 151 operates while being restricted by making contact with the inclined surfaces 153d, 153d of the wedge portions 153c, 153c of the wedge structure 153, and hence the locking plate 151 can stably perform the rising operation.

Then, similarly to the above, the locking plate 151, the wedge structures 153, 153, and the release plate 154 all rise together (see FIGS. 11(d), 11(e)) and, after the locking plate spring 152c has fully extended, as illustrated in FIG. 11(f), the wedge structures 153, 153 and the release plate 154 displace further upward to achieve the wedge effect.

INDUSTRIAL APPLICABILITY

The seat slide adjuster according to the present invention can even be applied to a seat for stands and the like. However, the seat slide adjuster according to the present invention, as described in the above-described embodiment, is particularly favorably used in a seat that is often adjusted back and forth in various types of vehicles such as an automobile, an airplane, a train, a ship, and a bus.

REFERENCE SIGNS LIST 10 seat slide adjuster
11 lower rail
12 upper rail
12a upper wall
12b side wall
120 upper bracket
121 upper surface portion
122 side surface portion
15 locking mechanism
151 locking plate
151b hole portion
151d longitudinal edge portion
152 locking mechanism support member
152a locking plate guide shaft
152b wedge guide shaft
152c locking plate spring
152d wedge spring
153 wedge structure
153c wedge portion
153d inclined surface
154 release plate
155 unlock operation member

What is claimed is:
1. A seat slide adjuster for adjusting a position of a seat in a front-rear direction, comprising:
   a lower rail;
   an upper rail that is slidably provided to the lower rail and used to connect to a seat frame of the seat; and
   a locking mechanism that locks the upper rail to the lower rail at an appropriate slide position,
   wherein the lower rail comprises locking tooth parts on both sides in a longitudinal direction that protrude downward in a comb shape, and
   wherein the locking mechanism comprises:
      a locking plate that corresponds to the locking tooth parts located on both sides of the lower rail in the longitudinal direction that includes an engaged portion that engages with the locking tooth parts formed in two rows;

a locking mechanism support member supported on the upper rail side and including a locking plate spring for elastically supporting the locking plate so as to allow the engaged portion of the locking plate to engage with the locking tooth parts; and at least one wedge structure that includes a plurality of wedge portions, wherein the at least one wedge structure (1) is disposed at a position adjacent to a longitudinal edge portion of the locking plate along a longitudinal direction of the upper rail, (2) is elastically supported by a wedge spring provided to the locking mechanism support member, and (3) makes contact with the longitudinal edge portion of the locking plate to press the locking plate inward during locking.

2. The seat slide adjuster according to claim 1, wherein the plurality of wedge portions of each of the at least one wedge structures are respectively disposed at predetermined intervals in a direction orthogonal to the longitudinal direction of the upper rail, and each of the at least one wedge structures makes contact with a plurality of portions on each of the longitudinal edge portions of the locking plate at predetermined intervals.

3. The seat slide adjuster according to claim 1, wherein the locking mechanism support member comprises:

a base plate portion fixed to the upper rail side;

a locking plate guide shaft that protrudes in a direction of an upper wall of the upper rail from the base plate portion;

a pair of wedge guide shafts provided at a predetermined interval to sandwich the locking plate guide shaft that protrude in the direction of the upper wall of the upper rail from the base plate portion;

the locking plate spring that is disposed on the locking plate guide shaft; and the wedge spring that is disposed on the wedge guide shaft.

4. The seat slide adjuster according to claim 3, further comprising an upper bracket provided on an inner side of the upper rail, wherein the base plate portion of the locking mechanism support member is supported by the upper bracket.

5. The seat slide adjuster according to claim 4, wherein the upper bracket is formed into a shape having a substantially U-shaped cross section, an opening side of the upper bracket is disposed so as to face the lower rail side, the base plate portion of the locking mechanism support member is fixed to the opening side, and upper end portions of the locking plate guide shaft and each of the wedge guide shafts are fixed to an upper surface portion of the upper bracket, a substantially box-shaped structure formed of the upper bracket and the base plate portion comprising a strength member.

6. The seat slide adjuster according to claim 3, wherein a highest end position of the wedge spring during extension is set higher than a highest end position of the locking plate spring, and wherein each of the plurality of wedge portions of the at least one wedge structure has an inclined surface that protrudes inward along a downward direction, and a lower portion of the inclined surface of the wedge portion makes contact with each of the longitudinal edge portions of the locking plate during locking.

7. The seat slide adjuster according to claim 1, wherein a release plate that can be downwardly displaced by operating an unlock operation member is disposed on an upper side of the locking plate and the wedge structure.

8. The seat slide adjuster according to claim 1, wherein the lower rail includes a bottom wall; a pair of opposing first side walls that stand upright from each side of the bottom wall; a pair of top walls that are bent inward toward each other from upper edges of each of the first side walls and have opposing edges separated from each other by a predetermined distance; and inner walls that are bent downward from inner end edges of the upper walls, the locking tooth parts that protrude downward in the comb shape being formed in the inner walls, wherein the upper rail includes an upper wall; a pair of opposing second side walls that are bent downward from each side of the upper wall; and folded pieces that are folded outwardly upward from lower end portions of each of the second side walls, wherein the upper rail is disposed such that the folded pieces are positioned between each of the first side walls and the inner walls of the lower rail, wherein each of the folded pieces of the upper rail includes a first inclined piece that extends upward obliquely outward from lower edge portions of the second side walls, and a second inclined piece that extends upward obliquely outward after being bent inward from the first inclined piece, wherein a rolling member is disposed between each of the first inclined piece and the second inclined piece and the lower rail opposed thereto, and wherein the first inclined piece and the second inclined piece are formed at an inclination angle at which respective imaginary extension lines that extend outward of the first inclined piece and the second inclined piece intersect each other.

9. The seat slide adjuster according to claim 8, wherein an intersection angle of the imaginary extension lines is within a range of from 5 to 15°.

* * * * *